United States Patent [19]

Gutfleisch et al.

[11] Patent Number: 4,886,481
[45] Date of Patent: Dec. 12, 1989

[54] TENSIONING DEVICE FOR MAINTAINING TWO SHAFT SECTIONS IN PLAYFREE ENGAGEMENT IN THE DIRECTION OF ROTATION

[75] Inventors: Siegfried Gutfleisch, Bisingen; Gerhard Hopsch, Obersulm; Einhard Kleinschmit, Esslingen, all of Fed. Rep. of Germany

[73] Assignee: Daimler-Benz Aktiengesellschaft, Stuttgart, Fed. Rep. of Germany

[21] Appl. No.: 237,319

[22] Filed: Aug. 29, 1988

[30] Foreign Application Priority Data

Sep. 3, 1987 [DE] Fed. Rep. of Germany ....... 3729393

[51] Int. Cl.$^4$ ............................ F16D 1/10; F16D 3/06
[52] U.S. Cl. .................................... 464/162; 403/359; 403/372; 464/180
[58] Field of Search ................ 267/161, 181; 403/359, 403/365, 372; 464/98, 162, 169, 180, 182, 901

[56] References Cited

U.S. PATENT DOCUMENTS

| | | | |
|---|---|---|---|
| 2,798,748 | 7/1957 | Maurer | 403/372 |
| 3,201,895 | 8/1965 | Stivers | 403/359 X |
| 3,380,097 | 4/1968 | Pharris | 403/359 X |
| 3,383,882 | 5/1968 | Smirl | 464/162 |

FOREIGN PATENT DOCUMENTS

| | | | |
|---|---|---|---|
| 469175 | 5/1975 | Austria | 403/359 |
| 1808076 | 8/1969 | Fed. Rep. of Germany . | |
| 3501132 | 9/1985 | Fed. Rep. of Germany | 464/180 |
| 398777 | 1/1974 | U.S.S.R. | 403/372 |
| 907945 | 10/1962 | United Kingdom . | |

Primary Examiner—Daniel P. Stodola
Attorney, Agent, or Firm—Barnes & Thornburg

[57] ABSTRACT

A coupling arrangement for two axially aligned shaft sections is obtained through two splined profiles, one attached to each shaft through a tensioning arrangement that eliminates relative rotation between the two shaft sections while permitting longitudinal movement therebetween. One shaft section connected to one end of the tensioning device and the other shaft section connected to another end of the tensioning device and wherein the other end of the tensioning device operates to cause one of the splined profiles which is slotted to grasp the other splined section to provide for the relative non-rotational drive and the axial longitudinal shifting of the shaft sections.

8 Claims, 1 Drawing Sheet

TENSIONING DEVICE FOR MAINTAINING TWO SHAFT SECTIONS IN PLAYFREE ENGAGEMENT IN THE DIRECTION OF ROTATION

BACKGROUND AND SUMMARY OF THE INVENTION

The invention relates to a tensioning device for maintaining two splined shaft sections in engagement without play in the direction of rotation.

A tensioning device of this type is known from German patent (DE-PS) No. 1,808,076. It serves to maintain the splined shaft profiles virtually without play while maintaining an axial mobility.

In this case the tensioning member forms a comparatively wide cylindrical ring made of resilient plastic which is to be fitted onto the shaft section to be inserted in the hublike shaft section, and which adjoins the end face of the hublike shaft section.

The tensioning element is constructed as a cylindrical collet, which is screwable by a female screwthread threaded onto an end male screwthread of the hublike shaft section. This collet, which is drawn radially inwards at its collet end remote from the hublike shaft section in order to brace a bracing ring which it receives, houses the resilient ring.

When the collet is screwed onto the hublike shaft section, the ring becomes tensioned under compression between the bracing ring and the end face of the hublike shaft section. This has the result that the plastic of the ring is pressed into the splined shaft profile of the shaft section which houses the ring, both against the end face of the hublike shaft section and against the inside face of the collet.

The ring therefore produces the desired freedom from play in the direction of rotation between the two shaft sections of their splined shaft profiles.

This device is therefore composed of a total of three components, each requiring separate manufacture, which have to be fitted onto one of the two shaft sections before the latter are plugged together. Then, after the splined shaft profiles are mutually engaged, the collet has to be screwed additionally onto the male screwthread of the hublike shaft section in order to compress the ring.

An underlying object of the invention is to disclose a tensioning device for maintaining in engagement without play in the direction of rotation the splined shaft profiles of two mutually longitudinally slidable shaft sections, for which production and assembly are considerably simplified and with which a special manual actuation of the tensioning member can be eliminated.

This object is achieved according to the invention by providing an arrangement wherein the hublike shaft section is slitted tongs fashion at its free end region, wherein the tensioning member is at least one slightly tapered annular spring arranged on the slitted end region of the hublike shaft section, and wherein the tensioning element is a stop against which the annular spring is pressable by its outer edge part in the course of bringing the two shaft sections into mutual engagement in order to generate a radial tensioning force.

The tensioning device according to the invention therefore comprises only two device parts to be associated separately with the two shaft sections, namely the annular spring and the stop, the annular spring being available as an easily assembled standard part. The annular spring and the hublike shaft section which houses it must then be mutually coordinated in diameter so that, at least when the radial stretched position of the annular spring is reached, or when the annular spring is pressed flat, the desired playfree engagement of the splined shaft profiles is obtained with simultaneously a slight axial sliding mobility.

Independently of the axial stroke of the hublike shaft section required to tension the annular spring, its conformation and thickness influence the axial and radial forces which it can generate.

At least one customary plate spring or annular tension washer, or a combination of corresponding plate springs and/or annular tension washers, may advantageously be used as an annular spring according to certain preferred embodiments of the invention.

Such annular springs, in the relaxed state, can be fitted without difficulty onto the hublike shaft section with a correspondingly enlarged inside diameter. The axially directed return force residual in such annular springs in their radial stretched position efficaciously assists the corresponding dismantling operations when the annular springs are relaxed in order to release the two shaft sections.

The annular spring will then conveniently be brought into engagement with a circumferential groove provided at the slitted end region of the hublike shaft section, which groove simultaneously forms a keeper device for the annular spring, so that the latter can be preassembled on the shaft section.

The radial tensioning force which can be generated by the annular spring can be still further increased without much technical outlay by arranging the annular spring within a cylindrical collar of the stop, against which it becomes braced during the course of its pretensioning.

A further advantage of the construction according to the invention lies in the fact that the radial tensioning forces to be generated by the annular spring are obtained for only a short sliding stroke of the hublike shaft section, without any need to actuate the annular spring itself manually at all. Therefore, in contrast to the known tensioning device, no accessibility of the tensioning device is required for the assembly or for bringing the two shaft sections into mutual engagement. This makes it possible to use the tensioning device according to the invention with particular advantage when the shaft sections are the shaft ends of a final drive shaft and of a final gear drive shaft of a motor vehicle transmission line which are required to be mutually coupled, and the shaft end of the final gear drive shaft and the stop fastened to the final gear and associated with the annular spring protrude into a tube end of a central tube connected by flanges both to the engine gearbox unit and to the final gear of the motor vehicle and housing the final drive shaft.

Other objects, advantages and novel features of the present invention will become apparent from the following detailed description of the invention when considered in conjunction with the accompanying drawings.

DETAILED DESCRIPTION OF THE DRAWINGS

Figure 1:
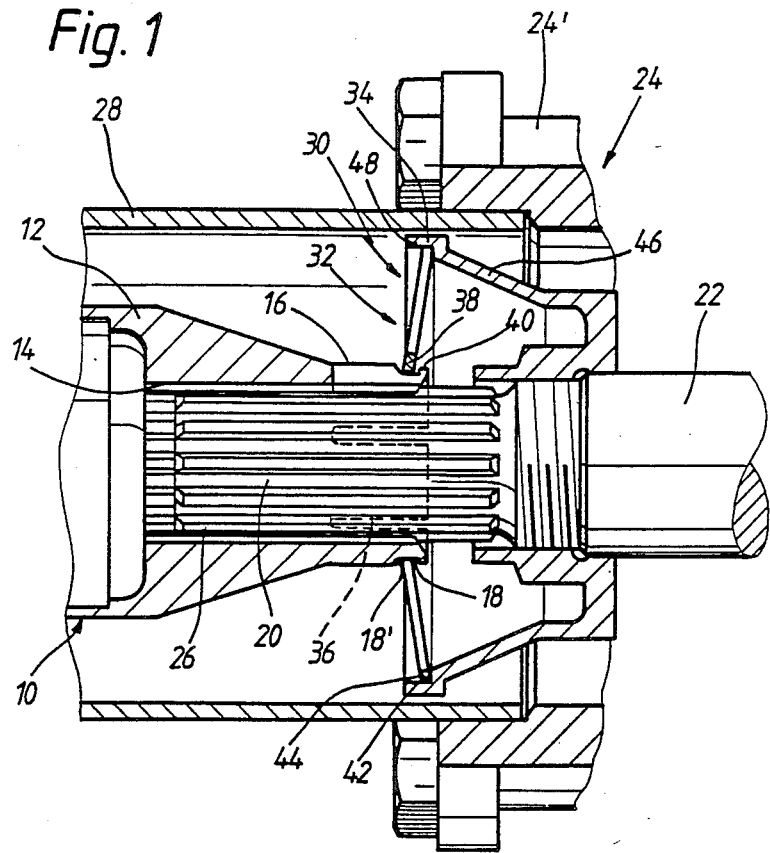
FIG. 1 is a schematic partial longitudinal sectional view through a motor vehicle transmission line in the region of the rear axle gear constructed according to a preferred embodiment of the invention, in which the annular spring of the tensioning device for maintaining freedom from play of the mutually engaged splined shaft profiles of a final drive shaft and a final gear/drive shaft in the direction of rotation is shown in its released position.

A final drive shaft 10 is drivable by an internal-combustion engine of a motor vehicle and exhibits a hublike shaft section 12, a so-called differential hub, at the rear end. This shaft section 12 is equipped with a splined shaft profile 14 on its internal circumference and exhibits, for example, a cylindrical end piece 16, which is preferably equipped with an external circumferential groove 18 near its end face.

The hublike shaft section 12 is engaged by a spigot-like shaft section 20 of a drive shaft 22, of a rear axle gear 24 for example, which is likewise equipped for that purpose with a corresponding splined shaft profile 26 on its external circumference.

Reference character 28 designates a so-called central tube, which is connected by flanges and centered in a suitable manner with its end faces to a gearbox integrated with the internal combustion engine on one hand and to the rear axle gear 24 on the other hand, and which houses both the final drive shaft 10 and also the shaft section 20 of the drive shaft 22 belonging to the rear axle gear 24.

By means of a tensioning device, generally designated 30, which is likewise located within the central tube 28, the splined shaft profiles 14 and 26 mutually engaged and located in the hublike shaft section 12 are maintained, still with mobility in the axial direction, but without play in the direction of rotation, in order to prevent flank play. This ensures that it is no longer possible for an audible buzzing resulting from oscillations, and load change noises in the transmission line, to occur.

This tensioning device 30 is formed by the cylindrical end piece 16 of the hublike shaft section 12, by a slightly tapered annular spring 32 serving as tensioning member and plugged onto the cylindrical end piece 16, and by a stationary stop 34 serving as a tensioning element associated with the spring 32.

The cylindrical end piece 16 of the shaft section 12 which retains the annular spring 32 is constructed tongs fashion and accordingly exhibits a plurality of slits 36 leading to its end face. The annular spring 32 is formed, for example, by an annular tension spring, known per se, the annular washer-shaped spring element 38 of which exhibits a meander-shaped configuration. In the relaxed state, the latter can be slid over the collar 40, which delimits the external circumferential groove 18 on the one side, of the slitted cylindrical end piece 16 belonging to the hublike shaft section 12. For this purpose, the relevant dimensions of the two parts are chosen mutually so that the annular tension spring 32 is accordingly retained securely in the external circumferential groove 18 and the diameter of the groove bottom corresponds substantially to the internal diameter of the annular tension spring 32. Instead of the external circumferential groove 18, as the necessary abutment for the tensioning of the annular tension spring, an external ring shoulder could simply be shaped on the external circumference of the cylindrical end piece 16 and would fulfill the function of a stop for the annular tension spring 32.

The stationary stop 34 exhibits a preferably annular stop surface 42 coaxial with the annular tension spring 32, against which the edge piece 44 of the annular tension spring 32 comes into abutment in the course of the sliding of the hublike shaft section 12 onto the shaft section 20. The stop surface 42 preferably forms the end face of a collar 46 widening conically towards the stop surface 42, and is itself secured in suitable manner to the housing 24' of the rear axle gear 24. An end flange 48 which encloses the annular tension spring 32, and the inside diameter of which is only slightly greater than the outside diameter of the annular tension spring 32 in the relaxed state, is preferably also shaped onto the stop surface 42.

Figure 2:
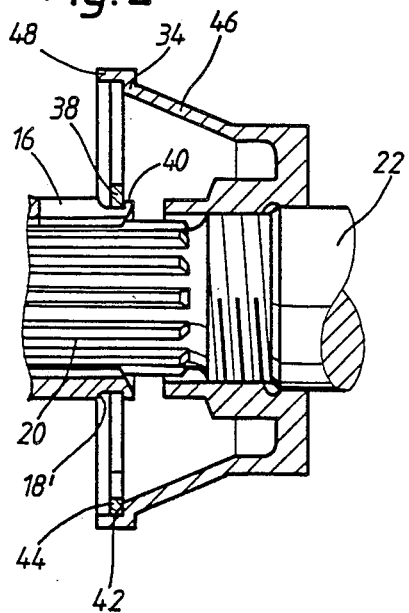
FIG. 2 is a view showing a detail from FIG. 1, in which the annular spring of the tensioning device is shown in the tensioned state.
Figure 3:
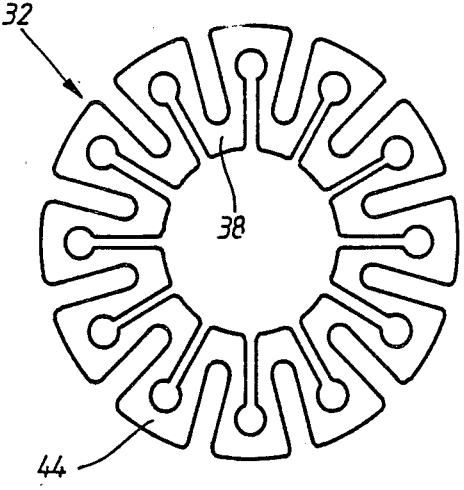
FIG. 3 shows an elevation of the annular spring of FIGS. 1 and 2.

The tensioning device 30 explained operates as self-tensioning. When the two shaft sections 12, 20 are plugged into each other, when the annular tension spring 32 comes into abutment with the stop 34, it is pressed progressively flatter during the further axial sliding of the final drive shaft 10 and of the shaft section 12, by being braced internally against the groove wall 18' of the shaft section 12, which performs the stop function (FIG. 2).

The annular tension spring 32 is therefore transferred into a radial stretched position, while its inside diameter is correspondingly decreased, whereby the members of the tongslike end piece 16 of the shaft section 12 which are formed by the slits 36 are deflected radially inwards and the mutual engagement play of the two splined shaft profiles 14, 26 is reduced to a minimal dimension by the effective radial force in the direction of rotation of the shaft sections 12, 20, although a certain mutual radial mobility of the latter remains. An increase in the radial tensioning force is then further achieved by the end flange 48 of the stop 34.

The splined shaft profiles may be of different configuration. They may be key shaft profiles or notch tooth profiles, for example.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A coupling device to maintain two shaft sections in driving engagement without play in the direction of rotation, said two shaft sections being mutually connected with longitudinal sliding mobility therebetween by means of cooperating splined shaft profiles thereon, one shaft section having the shaft profile internal thereof and the other external thereof, a tensioning means provided in a free end region of a hublike shaft section of the one shaft section adjacent its internal shaft profile, said tensioning means being retained on the hublike shaft section, wherein the hublike shaft section is slitted tongs fashion at its free end region, wherein the tensioning means comprises at least one slightly tapered annular spring arranged on the end region of the hublike shaft section which is slitted, and wherein the tensioning means comprises a stop on the other shaft section against which the annular spring is pressable at an outer edge part in the course of bringing the two shaft sections into axial and mutual engagement in order to generate a radial tensioning force to cause the slitted end tongs to urge the internal shaft profile of the one shaft section against the external shaft profile of the other shaft section so that the two shaft sections will rotate in unison without rotational play and while allowing the two shaft profiles to be slid in said longitudinal direction to permit longitudinal mobility between said two shaft sections.

2. A coupling device according to claim 1, wherein the annular spring is of plate spring-like construction.

3. A coupling device according to claim 2, wherein the stop has an end flange coaxial with the shaft sections and wherein the stop abuts against an internal circumference of the annular spring to brace the spring while it is being tensioned as the shaft sections are brought together.

4. A coupling device according to claim 1, wherein the annular spring is formed as an annular tension washer spring.

5. A coupling device according to claim 4, wherein the stop has an end flange coaxial with the shaft sections and wherein the stop abuts against an internal circumference of the annular spring to brace the spring while it is being tensioned as the shaft sections are brought together.

6. A coupling device according to claim 1, wherein the stop has an end flange coaxial with the shaft sections and wherein the stop abuts against an internal circumference of the annular spring to brace the spring while it is being tensioned as the shaft sections are brought together.

7. A coupling device according to claim 6, wherein the one shaft section is connected to an input drive shaft and the other shaft section is connected to an output drive shaft, and wherein that the shaft end of the output drive shaft and the stop associated with the annular spring protrude into a tube end of a central tube means which houses the input drive shaft.

8. A coupling device according to claim 1, wherein the one shaft section is connected to an input drive shaft and the other shaft section is connected to an output drive shaft, and wherein that the shaft end of the output drive shaft and the stop associated with the annular spring protrude into a tube end of a central tube means which houses the input drive shaft.

* * * * *